(12) United States Patent
Gipson

(10) Patent No.: US 6,584,878 B2
(45) Date of Patent: Jul. 1, 2003

(54) TOOL HOLDER FOR FACILITATING THE USE OF SQUARE SHANKED TOOLING IN AUTOMATIC SCREW MACHINES IN PLACE OF CONVENTIONAL CIRCULAR FORM TOOLS

(76) Inventor: Gregory Lee Gipson, 4748 N. 28th Dr., Phoenix, AZ (US) 85017

( * ) Notice: Subject to any disclaimer, the term of this patent is extended or adjusted under 35 U.S.C. 154(b) by 0 days.

(21) Appl. No.: 09/873,501

(22) Filed: Jun. 4, 2001

(65) Prior Publication Data

US 2001/0049985 A1 Dec. 13, 2001

Related U.S. Application Data

(60) Provisional application No. 60/209,251, filed on Jun. 5, 2000.

(51) Int. Cl.⁷ .................................................. B23B 29/00
(52) U.S. Cl. ............................................. 82/158; 82/160
(58) Field of Search ........................ 82/158, 160, 161; 407/66, 102, 77, 92, 97, 101, 107

(56) References Cited

U.S. PATENT DOCUMENTS

| 309,871 A | * | 12/1884 | Palmer | 470/207 |
| 455,466 A | * | 7/1891 | Back | 27/31 |
| 1,193,945 A | * | 8/1916 | Taylor | 82/161 |
| 1,286,309 A | * | 12/1918 | Hawley | 407/73 |
| 2,848,918 A | * | 8/1958 | Lustrik | 82/158 |
| 3,141,366 A | * | 7/1964 | Frank, Sr. | 82/152 |
| 3,731,565 A | * | 5/1973 | Barkhurst | 82/152 |
| 4,087,194 A | * | 5/1978 | Takacs et al. | 407/100 |

* cited by examiner

Primary Examiner—Henry W. H. Tsai

(57) ABSTRACT

A tool that can be mounted and clamped in the circle tool receptacle of automatic screw machines and allows the holding and use of square shanked lathe tools. The technologically advanced tooling systems that are available to the computerized, numerically controlled machine industry are all square shanked and will now be available to the screw machine industry.

14 Claims, 2 Drawing Sheets

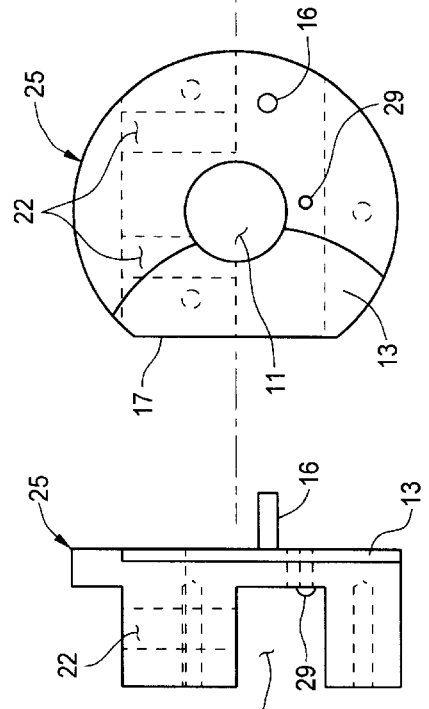
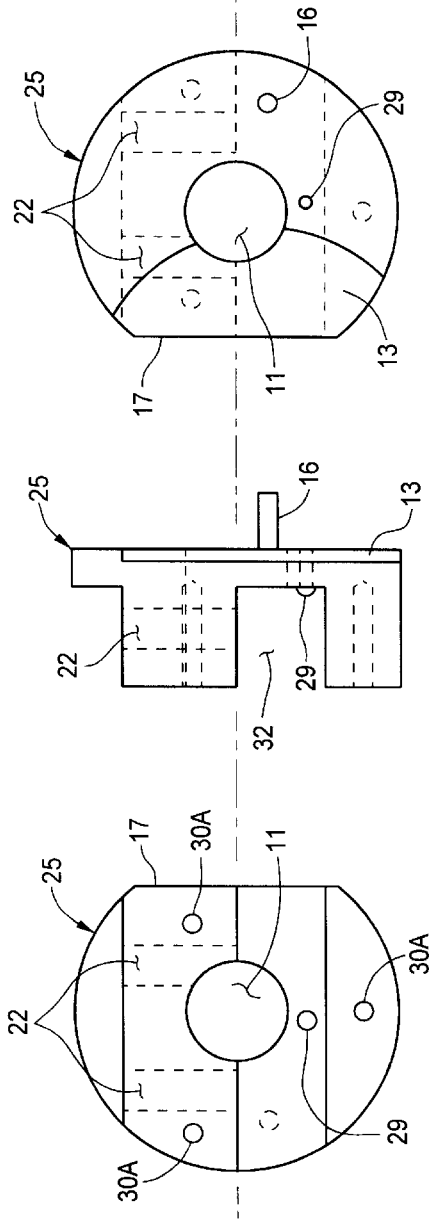
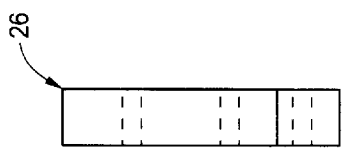
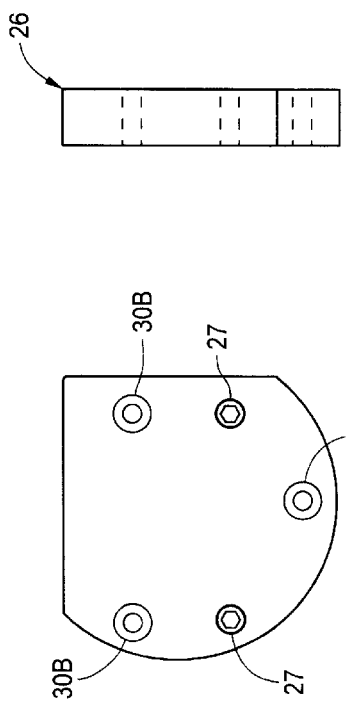

TOOL HOLDER FOR FACILITATING THE USE OF SQUARE SHANKED TOOLING IN AUTOMATIC SCREW MACHINES IN PLACE OF CONVENTIONAL CIRCULAR FORM TOOLS

This application claims benefit of provisional application 60/209,251 filed Jun. 5, 2000.

FIELD OF THE INVENTION

The present invention relates to a tool holder for allowing the use of square shanked tooling on automatic screw machines. For convenience, the subject tool holder is hereinafter referred to as "Stick Tool Holder."

BACKGROUND OF THE INVENTION

Traditionally, automatic screw machines of this type use a circular form tool to shape and form the part being made to its correct size.

These circular form tools are a major cost concern when evaluating the profitability of any given job.

The Stick Tool Holder allows the use of standard square shanked lathe tools to be used in place of the circular form tools. The cost of this lathe tool, the Stick Tool Holder, is a fraction of the circular form tool's cost.

The Stick Tool Holder has a clearance cut which allows work to be done much closer to the collet chuck. The Stick Tool Holder also has taper control of the tool bit without which the tool bit has to be reground to remove any unwanted taper that may exist on the finished part. There is also a cover plate which prohibits spreading of the Stick Tool Holder body due to the clamping pressure holding the tool bit in place.

Accordingly, there exists a need for a reliable, convenient, adjustable holder that allows the use of square shanked lathe tools, carbide tipped or high-speed steel, to be used on automatic screw machines. The subject Stick Tool Holder meets these needs in an economical and mechanically optimized manner.

DESCRIPTION OF THE RELATED PRIOR ART

Several holders for permitting the use of square shanked tooling in an automatic screw machine can be found in the prior art. One such prior art holder, designated the "KWIK FORM TOOL BIT HOLDER," can be seen in FIG. 4. This holder can only accommodate up to a ⅜ inch square tool bit in the Davenport Machine, an exemplary automatic screw machine which is very well known and widely used in the industry. Also, unlike the subject Stick Tool Holder, this holder does not have a cover plate to stop the spreading action caused by the clamping pressure on the tool bit. The holder, instead, has an excessively thick body web between the top and bottom of the tool bit opening to help stop the spreading problem. This thickness, however, creates another problem: doing work close to the collet chuck is difficult at best, and this is very important in small diameter work as the part has a tendency to flex away from the cutting tool causing a taper problem.

Another prior art holder is sold under the designation "FLAT FORM TOOL CIRCULAR HOLDER." This holder can be seen in FIG. 5 and, even though made by a different manufacturer, it suffers the exact same problems as the previously discussed prior art holder.

While prior art devices are to some extent effective in allowing the use of square shanked tools in automatic screw machines in place of traditional circular form tools, there is a definite need for a holder that will allow the use of larger tool bits, will not spread apart due to clamping pressure, will allow close to the collet work and will allow taper adjustment to the tool bit.

SUMMARY OF THE INVENTION

The above objects and advantages of the invention are accomplished by a Stick Tool Holder that can be secured in a circle tool receptacle of an automatic screw machine and then allow square shanked lathe tools, carbide tipped or otherwise, to be used.

The Stick Tool Holder has a cover plate which stops the spreading action caused by the pressure of the clamping bolts as they secure the square shanked tool bit in place. Because of this cover plate, the back side of the Stick Tool Holder can be thinned to a minimum and, with a clearance cut, work can be done on parts right next to the collet chuck.

There are two adjusting screws in the cover plate that make contact with the side of the square shanked tool bit. On the opposite side of the tool bit, half way between the two adjusting screws, is the domed head of a rivet mounted in the Stick Tool Holder body. This rivet head allows for a rocking action of the tool bit by the adjustment and tightening of the two screws in the cover plate. This adjustment allows taper control to be accomplished without regrinding of the tool bit.

Accordingly, the major cost of circular form tools and the regrinding of the tools to control taper will no longer be a problem.

The Stick Tool Holder also has the correct locating diameters and the engagement pin for a circle tool receptacle's (of an automatic screw machine) center fine controlling mechanism, known as the half moon gear.

In summation, there exists a need for a holder that will allow taper control and the use of all the square shanked tooling that is available in the metal working industry to be used on automatic screw machines. The subject Stick Tool Holder meets this need.

BRIEF DESCRIPTION OF THE DRAWINGS

The above object's advantages and features of the present invention will become more apparent from the following detailed description taken in conjunction with the accompanying drawings in which:

FIGS. 2A, 2B and 2C are single line drawings showing, respectively, the front, the side and the rear view of the Stick Tool Holder body.

FIGS. 3A and 3B are single line drawings showing, respectively, the Stick Tool Holder's cover plate in front and side views.

DETAILED DESCRIPTION OF THE PREFERRED EMBODIMENT(S)

Figure 1B:
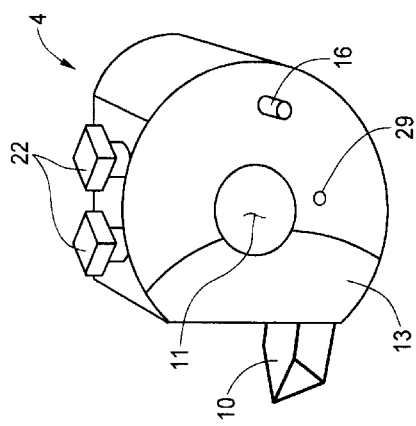
FIGS. 1A and 1B are pictorial, perspective views of the Stick Tool Holder respectively showing the front and rear faces and much of the side structure.
Figure 1A:
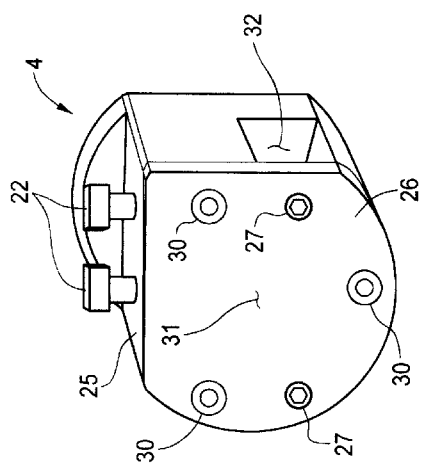
Figure 5:
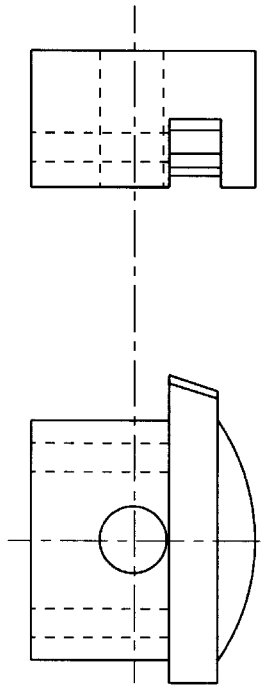
FIG. 5 shows a different manufacturer's example of related prior art.
Figure 4:
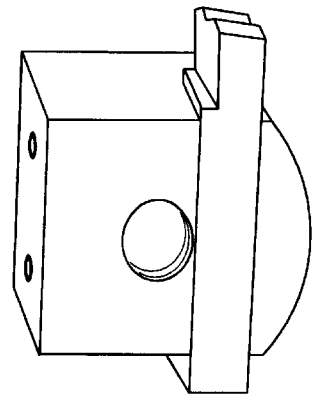
FIG. 4 shows a first example of related prior art.

Referring now to the drawings, particularly FIGS. 1 through 3, the tool of the present invention includes a central locating diameter 11, threaded or otherwise, that centers the Stick Tool Holder 4 in its mounting apparatus, whether it be a swing arm or a slide, all as well known in the art. The Stick Tool Holder 4 also has a locating pin 16 of sufficient size to conventionally engage with an automatic machine tool receptacle's half moon adjustable rotation gear (not shown) to adjust the center line of the work being machined with the cutting edge of the stick tool. There is a clearance cut 13 on the back side of the Stick Tool Holder which permits adjustment as close as possible to the automatic screw machine's collet chuck, thus allowing the complete use of the automatic screw machine's length capabilities. The Stick Tool Holder also has a clearance cut 17 on the front side allowing the cutting tool edge to be placed at the proper location "at the circumference line" as this is necessary for the automatic screw machine to function properly. The Stick Tool Holder has an appropriate number of hold down screws 22 of sufficient size to secure an exemplary ½ inch square shanked stick tool 10 (larger than can be accommodated by the prior art devices discussed above) in a tool receptacle 32 of the Stick Tool Holder body 25. The Stick Tool Holder 4 also has a front cover plate 26 mounted to the body 25 by an appropriate number of screws 30 extending into threaded apertures 30B which keep the body 25 from spreading apart due to the clamping pressure of the hold down screws 22.

The Stick Tool Holder has taper adjustment consisting of adjusting screws 27 in the cover plate 26 that extend into the tool receptacle 32 and intersect the exemplary square shanked stick tool 10 on either side of its length center line which is rocking on the head of a domed rivet 29 (refer to FIG. 2B) on the opposite side of the square shanked stick tool and located in a hole in the Stick Tool Holder body 25. All screw and rivet contact points are on the square shanked stick tool's thickness center line.

The outside diameter of the Stick Tool Holder is consistent with whatever diameter circle tool a given automatic screw machine is designed to use. The cover plate 26 has sufficient unused surface 31 to accommodate the marking or labeling of a manufacturer's name for identification purposes. The cover plate 26 mounting screws 30 are of the countersunk (see 30C in FIG. 3A) variety as they allow absolutely no movement or spread of the holder body 25. The hold down screws 22 are of the square head variety as this is consistent with the automatic machine screw industry. The Stick Tool Holder 4 is made of heat treated alloy steel fashioned from round bar stock, sawed into pieces, faced, drilled, bored and reamed on a suitable lathe. Slots and clearance cuts are milled, then the Stick Tool Holder body 25 and cover plate 26 are drilled, tapped and countersunk, stamped, heat treated, black oxided, surfaces ground, and then assembled.

While the principles of the invention have been made clear in the illustration embodiments set forth above, it will be obvious to those skilled in the art to make various modifications to the structure, arrangement, proportion, elements, materials and components used in the practice of the invention to the extent that these various modifications do not depart from the spirit and scope of the appended claims, rather, they are intended to be encompassed therein.

What is claimed is:

1. A stick tool holder for allowing the use of a square shanked tool to be mounted, adjusted, and used in a circle tool mounting receptacle of an automatic screw machine in place of a conventional circular form tool, said stick tool holder comprising:
    A) a main body having:
        1) a shape and a size suitable for placement in the circle tool mounting receptacle of the automatic screw machine;
        2) a tool receptacle in said main body for receiving a square shanked tool having a cutting edge; and
        3) a center locating bore utilized to control rotation of said stick tool holder to establish center line contact between a part being made and the square shanked tool's cutting edge;
    B) tool fixing means for clamping the square shanked tool in said tool receptacle with its cutting edge presented at the circumferential line in the circle tool mounting receptacle; and
    C) a cover plate bolted to the main body to prevent spreading of said main body due to clamping pressure on the square shanked tool.

2. The tool holder of claim 1 further comprising taper control means for adjusting the angle of the square shanked tool; said taper control means including a dome shaped projection extending into said tool receptacle at a position intermediate the axes of first and second screws extending through said cover plate to engage the side of the square shanked tool opposite the side thereof engaged by said dome shaped projection, the axis of said dome shaped projection being intemediate the axes of said first and second screws.

3. The tool holder of claim 1 wherein an engagement pin extending from said main body is utilized to adjust the rotation of said stick tool holder by a mechanism incorporated in the circle tool receptacle of the automatic screw machine.

4. The tool holder of claim 1 further including a clearance cut on a back side of said main body to allow close to the collet work.

5. The tool holder of claim 4 further including a clearance cut on a front side of said main body to allow the cutting edge of the square shanked tool to be on the same circumference line where the cutting edge of a conventional circular form tool would be.

6. The tool holder of claim 1 wherein bolting of said cover plate is accomplished with countersunk screws which prohibit any distortion of said main body due to clamping pressure resulting from fixing the square shanked tool in said tool receptacle.

7. The tool holder of claim 1 wherein said cover plate is designed to allow space for the manufacturer's identification.

8. The tool holder of claim 1 wherein said main body and said cover plate are made of heat treated alloy steel.

9. The tool holder of claim 2 wherein an engagement pin extending from said main body is utilized to adjust the rotation of said stick tool holder by a mechanism incorporated in the circle tool receptacle of the automatic screw machine.

10. The tool holder of claim 2 further including a clearance cut on a back side of said main body to allow close to the collet work.

11. The tool holder of claim 10 further including a clearance cut on a front side of said main body to allow the cutting edge of the square shanked tool to be on the same circumference line where the cutting edge of a conventional circular form tool would be.

12. The tool holder of claim 2 wherein bolting of said cover plate is accomplished with countersunk screws which prohibit any distortion of said main body due to clamping pressure resulting from fixing the square shanked tool in said tool receptacle.

13. The tool holder of claim 2 wherein said cover plate is designed to allow space for the manufacturer's identification.

14. The tool holder of claim 2 wherein said main body and said cover plate are made of heat treated alloy steel.

* * * * *